United States Patent Office 3,119,806
Patented Jan. 28, 1964

3,119,806
PERIMIDINIUM AZO DYESTUFFS
Jacques Voltz, Basel, and Werner Bossard, Riehen, near Basel, Switzerland, assignors to J. R. Geigy A.-G., Basel, Switzerland
No Drawing. Filed Aug. 23, 1962, Ser. No. 218,823
Claims priority, application Switzerland Aug. 24, 1961
7 Claims. (Cl. 260—146)

The present invention concerns new, water soluble perimidinium azo dyestuffs, processes for the production thereof, the use of these dyestuffs for the dyeing of polymeric and copolymeric acrylonitrile and the material fast dyed therewith.

It has been found that valuable basic azo dyestuffs containing no groups which dissociate acid of the general Formula I

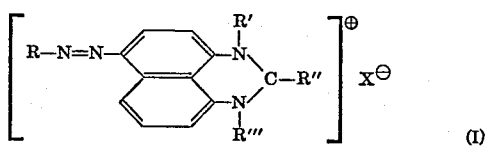

are obtained if carbinols of the general Formula II

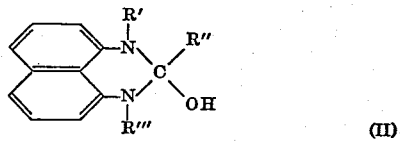

are coupled with diazonium compounds to form azo dyestuffs and these are reacted with acids to form salts.

In these formulae

R represents a monocyclic aryl radical which is free from water solubility-imparting acidic groups such as sulphonic acid or carboxylic acid groups and which is unsubstituted or optionally substituted with from one to three shade-varying substituents, Each of R' and R''' are lower alkyl with maximally 4 carbon atoms, in particular —$CH_3$ or —$C_2H_5$, R'' is hydrogen or preferably lower alkyl with maximally 4 carbon atoms, especially —$CH_3$ or —$C_2H_5$, and $X^-$ is an equivalent weight of a dyestuff-compatible anion, e.g. $Cl^-$ or $ZnCl_3^-$.

The anion $X^-$ in the dyestuff according to the invention should preferably be uncoloured, so that it is of no significant influence on the shade of the dyeings. It functions merely as a salt-forming and thereby water-solubilising component.

By the term "shade-varying substituents" as used in this specification and in the appended claims are meant the following substituents: halogen, in particular chlorine, lower alkyl (1 to 4 carbon atoms), in particular —$CH_3$, lower alkoxy (1 to 4 carbon atoms), in particular —$OCH_3$, lower alkoxy carbonyl, e.g. ethoxycarbonyl, carboxylic acid amide radicals, especially carbo-di-(N-N-lower alkyl)-amide, sulphonic acid amide radicals, especially sulphonyl-di-(N-N-lower alkyl)-amide, lower alkyl sulphonyl, e.g., —$SO_2CH_3$, acylamino, e.g., acetyl amino, hydroxy nitro, cyano, and finally monocyclic aralkyl with maximally 9 carbon atoms, monocyclic aryl and monocyclic aryloxy, wherein the benzene nucleus is either unsubstituted or substituted with one to three of the preceding shade-varying substituents. Preferably the numbers of these substituents do not exceed two.

The present invention relates also to dyestuffs of the formula

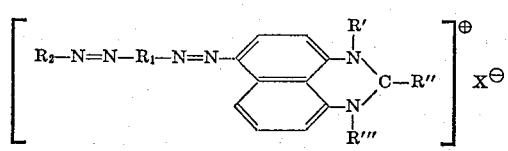

wherein each of $R_1$ and $R_2$ represent a monocyclic aryl radical which is free from water solubility-imparting acidic groups and which is unsubstituted or optionally substituted with from one to three shade-varying substituents as defined above, and R', R'', R''' and $X^-$ have the meaning given under Formula I.

Preferred substituents in $R_2$ are hydroxy, methoxy and acetylamino groups.

For example, the following azo components can be used:

aminobenzene,
1-amino-2-methylbenzene,
1-amino-3-methylbenzene,
1-amino-4-methylbenzene,
1-amino-2,5-dimethylbenzene,
1-amino-2,4-dimethylbenzene,
1-amino-2-methoxybenzene,
1-amino-3-methoxybenzene,
1-amino-4-methoxybenzene,
1-amino-5-methyl-2-methoxybenzene,
1-amino-2,5-dimethoxybenzene,
1-amino-2-chlorobenzene,
1-amino-3-chlorobenzene,
1-amino-4-chlorobenzene,
1-amino-2,4-dichlorobenzene,
1-amino-2,5-dichlorobenzene,
1-amino-3,4-dichlorobenzene,
1-amino-2,5-dimethyl-4-chlorobenzene,
1-amino-4-cyanobenzene,
1-amino-3-acetylamidobenzene,
1-amino-4-acetylamidobenzene,
1-amino-4-methylsulphonylbenzene,
1-amino-4-phenylsulphonylbenzene,
1-aminobenzene-4-sulphonamide,
1-aminobenzene-4-sulphone-methylamide,
1-aminobenzene-4-sulphone dimethylamide,
1-aminobenzene-4-sulphone-N-methyl-N-(β-hydroxyethyl)-amide,
1-amino-2-nitrobenzene,
1-amino-3-nitrobenzene,
1-amino-4-nitrobenzene,
1-amino-2-nitro-4-methoxybenzene,
1-amino-2-methoxy-4-nitrobenzene,
1-amino-2-chloro-4-nitrobenzene,
4-amino-azobenzene,
4-amino-4'-oxy-azobenzene,
4-amino-4'-methoxy-azobenzene,
4-amino-4'-acetamido-azobenzene.

The new types of compounds 1,3-dialkyl- or 1,2,3-trialkyl-1,2-dihydro-2-hydroxy-perimidines of the general Formula II (R'' is hydrogen or alkyl) are obtained starting from the corresponding perimidines (see Sachs, A., 365, 53 ff. (1909)). Thus for example, on alkylating 2-alkyl perimidines with methyl iodide in methanol, 2-alkyl-3-methyl perimidinium iodides of Formula III are formed, which iodides are converted by the action of strong alkalies into 1-methyl-2-alkyl perimidines of Formula IV. On further alkylating compounds of Formula IV

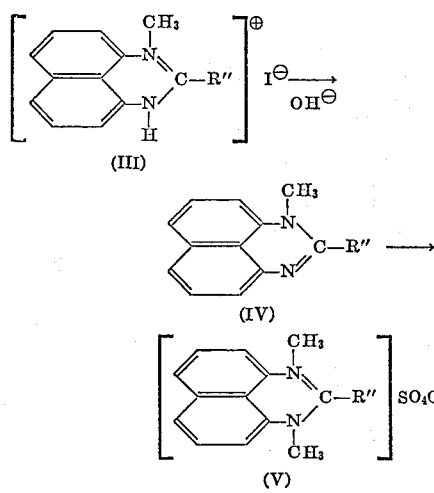

e.g. with dimethyl sulphate, pale yellow coloured 1,3-dimethyl-2-alkyl-perimidinium methosulphates of Formula V which are very stable in acid, aqueous solution are formed. On reaction with strong lyes such as sodium hydroxide solution or caustic potash solution in aqueous or alcoholic solution, these add hydroxyl ions to form pseudo bases of Formula II. The pseudo bases or carbinols of Formula II are colourless compounds which crystallise well; they have poor solubility in water but dissolve well in alcohols.

For the alkylation of the perimidine ring, both in the process described above and also for the alkylation of the dyestuff itself, the usual esters of low aliphatic alcohols with strong acids such as halogen hydracids, sulphuric acid, p-toluene sulphonic acid etc. are used as alkylating agents. Examples of such are methyl iodide, dimethyl sulphate, p-toluene sulphonic acid methyl ester or the corresponding ethyl, n-propyl or n-butyl derivatives.

Because of their greater stability in comparison with 1,3 - dimethyl - 1,2 - dihydro - 2 - hydroxy - perimidine (R''=hydrogen), in the present process the 1,2,3-trialkyl-1,2-dihydro-2-hydroxy-perimidines are used with advantage.

The diazonium compounds are coupled with the carbinols of Formula II advantageously in the cold at pH values of 8 to 10 using alcoholic solutions of the coupling components; however, also aqueous suspensions of the carbinols can be coupled at pH values of 8 to 10. The red to violet azo dyestuffs of Formula VI, which dissolve with difficulty in water, so formed can be isolated direct by filtration. On reacting aqueous suspensions of azo dyestuffs of Formula VI

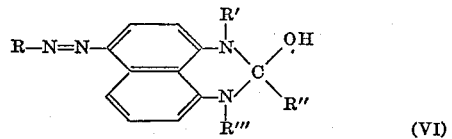

with acids, finally the yellow to red basic dyestuffs of general Formula I are obtained. The basic colour salts can be precipitated from the aqueous solutions to a great extent with sodium chloride; they are then in the form of chlorides.

A modification of the production process according to the invention consists in reacting the azo dyestuffs obtained by coupling the diazo compounds mentioned above with perimidine or N-alkyl perimidines of the general Formula VII

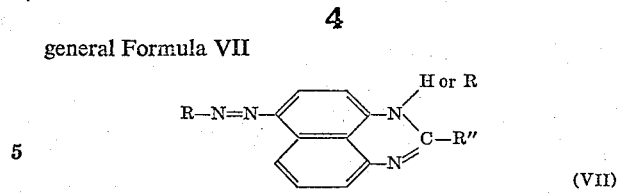

wherein R, R' and R'' have the meanings given above, with an alkylating agent X—R''', wherein X is the radical of a strong acid and R''' is a low alkyl radical, to form the quaternary colour salt I. Preferred alkylating agents for this process are dimethyl and diethyl sulphate, also methyl or ethyl bromide or iodide and, finally, p-toluene sulphonic acid methyl or ethyl ester. If both N atoms of the perimidine are not alkylated, then the secondary and tertiary nitrogen atom of the hetero ring can be alkylated in one step. In this case, advantageously an excess of alkylating agent is used. If R' is present, then the process is best performed in an inert organic solvent such as chlorobenzene, trichloroethylene or tetrachloroethane. Reaction temperatures of 80 to 150° are indicated and often pressure is necessary to perform the process. The colour salts produced according to the invention are separated from aqueous reaction solutions by salting out. Because of the stability of the colour salts according to the invention, the solvent in organic dyestuff solutions can also be distilled off at a raised temperature as such or with steam.

Another modification of the production process according to the invention consists in heating the coupling products of the diazo components mentioned above and 1,8-di-(N,N'-alkyl-amino)-naphthalenes for a short time with an excess of low fatty acids or with the anhydrides of low aliphatic carboxylic acids. The perimidine ring is formed and good yields of the basic dyestuffs of Formula I are obtained.

After isolation of the colour salts according to the invention, if desired they can be converted by double reaction into salts of other acids, or they can be combined with certain metal salts such as zinc chloride to form so-called double salts. The new dyestuffs according to the invention are used advantageously as salts of halogen hydracids, in particular as chlorides or zinc chloride double salts. In the form of such salts, the new dyestuffs dissolve in water with a more or less neutral reaction. They dye polymeric or copolymeric acrylonitrile fibres from a neutral to weakly acid aqueous bath at a raised temperature in yellow to red-brown shades.

Dyeings attained on polyacrylonitrile, in particular those on Orlon 42 of Du Pont, Wilmington, Del. (U.S.A.), with the colour salts according to the invention are distinguished by a very good fastness to light and excellent fastness to washing, also by good fastness to pressing and pleating. The new dyestuffs also have the valuable property that, when used for the dyeing of mixed polyacrylonitrile and wool fabrics, the latter is substantially completely reserved.

Further details regarding the production and use of the colour salts according to the invention can be seen from the following examples. Temperatures therein are in degrees centigrade and the parts are given as parts by weight. The relationship of parts by weight to parts by volume is as that of grammes to cubic centimetres.

*Example 1*

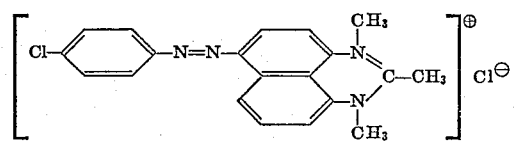

12.7 parts of 1-amino-4-chlorobenzene are diazotised in aqueous hydrochloric acid with sodium nitrite in the usual way. The pH of the cold diazonium salt solution is adjusted to 8–9 with sodium bicarbonate. While cooling well and stirring, a solution of 24 parts of 1,2,3-trimethyl-1,2-dihydro-2-hydroxy-perimidine in 150 parts of ethanol are slowly added and the pH of the coupling mixture is kept constant at 8–8.5 by the simultaneous addition dropwise of sodium bicarbonate solution. The red-violet monoazo dyestuff precipitates. As soon as the diazonium salt can no longer be traced, the coupling mixture is acidified with concentrated hydrochloric acid whereupon the colour changes from red-violet to yellow. The yellow colour salt is precipitated with sodium chloride, filtered off and dried. With sulphuric acid it has a green-blue and with sodium hydroxide solution it has a red-violet reaction. It dyes polyacrylonitrile fibres from an acetic acid bath in yellow shades; the bath is almost completely exhausted. The dyeings have excellent fastness to light and are extraordinarily wet fast.

Similar colour salts are obtained if in the above example, instead of 1-amino-4-chlorobenzene as diazo component, corresponding amounts of 1-amino-2-chlorobenzene, 1-amino-3-chlorobenzene, 1-amino-2,4-dichlorobenzene, 1-amino-2,5-dichlorobenzene, 1-amino-4-methoxybenzene, 1-amino-5-methyl-2-methoxybenzene, aminobenzene, 1-amino-2-methylbenzene, 1-amino-3-methylbenzene, 1-amino-4-methylbenzene, 1-amino-2,4-dimethylbenzene or 1-amino-2-5-dimethylbenzene are used and, as coupling components, corresponding amounts of 1,3-dimethyl-2-ethyl-, 1,3-dimethyl-2-propyl- or 1,3-dimethyl-2-butyl-1,2-dihydro-2-hydroxy-perimidine are used.

The coupling component used in the first paragraph of this example is produced, for example, as follows:

1,2,3-trimethyl-1,2-dihydro-2-hydroxy-perimidine: 18:1 parts of 2-methyl-perimidine and 42.6 parts of methyl iodide in 100 parts of methanol are heated in a closed vessel to 150°. On cooling, yellow 2,3-dimethyl-perimidinium iodide crystallises out: (M.P. about 230° under decomposition; C found, 47.87% (calculated, 48.1%), H found, 3.97% (calculated, 4.01%); N found, 8.68% (calculated, 8.64%). It is filtered off, washed with a little methanol and then dissolved in 200 parts of water. The 1,2-dimethyl-perimidine is precipitated by the slow addition dropwise of dilute sodium hydroxide solution. The dried base is dissolved in chlorobenzene at 110° while stirring with 14 parts of dimethyl sulphate and the solution is kept for half an hour at 110°. The 1,2,3-trimethyl-perimidinium methosulphate precipitates as pale yellow crystals. On reaction of the aqueous solution of this compound with potassium iodide, the corresponding iodide is obtained which melts at about 280° (under decomposition); C found, 73.77% (calculated, 73.6%); H found, 7.13% (calculated, 7.02%); N found, 12.53% (calculated, 12.3%). If dilute sodium hydroxide solution is added dropwise at 0–5° to the solution of 20 parts of this salt in water until the reaction is clearly phenolphthalein alkaline, then 1,2,3-trimethyl-1,2-dihydro-2-hydroxy-perimidine precipitates in the form of colourless crystals. These are filtered off under suction, washed with a little water and dried under vacuum. M.P. 124–126°; C found, 73.7% (calculated, 73.6%); H found, 7.13%, (calculated, 7.02%); N found, 12.53% (calculated, 12.3%).

If instead of dimethyl sulphate, a corresponding amount of diethyl sulphate is used under otherwise the same conditions, then 1,2-dimethyl-3-ethyl-perimidinium methosulphate or 1,2-dimethyl-3-ethyl-1,2-dihydro-2-hydroxy-perimidine is obtained. Under the same reaction conditions but starting from 2-ethyl perimidine, 1,3-dimethyl-2-ethyl-perimidinium methosulphate or 1,3-dimethyl-2-ethyl-1,2-dihydro-2-hydroxy-perimidine is obtained.

*Example 2*

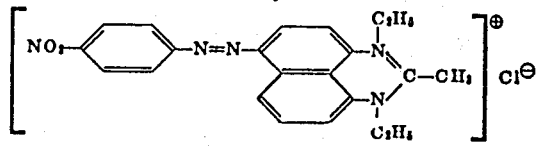

13.8 parts of 1-amino-4-nitrobenzene are diazotised in the usual way in hydrochloric acid with sodium nitrite. A solution of 26.7 parts of 1,3-diethyl-2-methyl-1,2-dihydro-2-hydroxy-perimidine in 200 parts of ethanol is added dropwise while cooling with ice to the diazo solution which has been buffered with sodium bicarbonate to pH 8 and filtered. The pH of the reaction solution remains constant at 8. On completion of the coupling, concentrated hydrochloric acid is added to the violet coupling mass and then the red basic dyestuff is salted out with sodium chloride. It dissolves in sulphuric acid with a green-blue and in water with a red-orange colour. From an acetic acid bath it dyes polyacrylonitrile fibres in brown-orange shades; the bath is considerably exhausted. The dyeings have excellent fastness to light.

Dyestuffs having similar properties are obtained if, as diazo component, instead of 1-amino-4-nitrobenzene, the corresponding amount of 1-amino-2-nitrobenzene, 1-amino-3-nitrobenzene, 1-amino-2-chloro-4-nitrobenzene, 1-amino-2-methoxy-4-nitrobenzene, 1-amino-2-nitro-4-methoxybenzene, 1-amino-4-cyanobenzene, 1-amino-4-methylsulphonylbenzene, 4-amino-diphenylmethane, 4-amino-diphenyl, 4-amino-diphenylether, 1-amino-benzene-4-carboxylic acid-N-N-dimethyl amide, 1-amino-benzene-4-sulphonic acid-N-N-diethylamide, 1-amino-2,6-dichloro-4-nitro-benzene, 1-amino-2,3,5-trichloro-benzene or 1-amino-2,3,4-trichloro-benzene is used and otherwise the above procedure is followed.

The coupling component used in this example is obtained from perimidine by a corresponding adaption of the method given in the last paragraph of Example 1.

*Example 3*

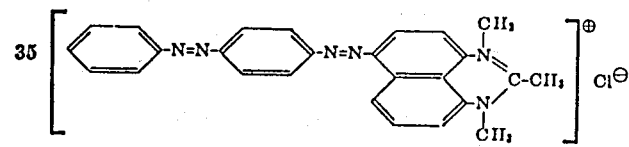

19.7 parts of 4-aminoazobenzene are diazotised in the usual way and the diazonium salt solution is buffered to pH 8 with sodium bicarbonate. In the meanwhile, a suspension of 1,2,3-trimethyl-1,2-dihydro-2-hydroxy-perimidine is prepared by adding dilute sodium hydroxide solution at 0.5° while stirring vigorously to a solution of 26 parts of 1,2,3-trimethyl-perimidinium chloride in 500 parts of water which also contains 5 parts of the condensation product of olein alcohol and 15 mols of ethylene oxide, until the reaction remains phenolphthalein alkaline. The clarified diazo solution is slowly poured while stirring into this suspension. On completion of the coupling, the reaction mass is acidified with glacial acetic acid and the brown colour salt is completely precipitated by the addition of sodium chloride and dried. The new dyestuff dissolves in concentrated sulphuric acid with a green-blue and in water with a red-brown colour. It dyes polyacrylonitrile fibres from an acetic acid bath in very light fast brown shades.

Similar colour salts are obtained by coupling diazotised 4-amino-4'-methoxyazobenzene, 4-amino-4'-acetaminoazobenzene, 4-amino-2-methoxy-5-methylazobenzene, 4-amino-2-methylazobenzene under otherwise the same procedure.

*Example 4*

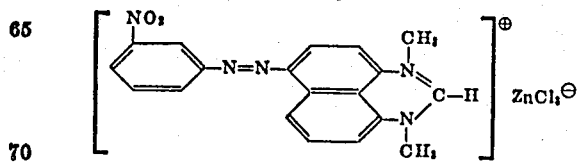

13.8 parts of 1-amino-3-nitrobenzene are diazotised and the diazo solution is carefully neutralised in the cold with sodium hydroxide solution and then clarified. In the meanwhile, a suspension of perimidine in water is prepared by pouring a solution of 16.7 parts of perimidine in 200 parts of dimethyl formamide while stirring vigorously into a solution of 5 parts of the condensation product of olein alcohol and 15 mols of ethylene oxide in 500 parts of ice water. The neutral diazo solution is added dropwise to this suspension and the pH of the coupling mass is adjusted to 8 by the addition of sodium bicarbonate. The violet azo dyestuff is filtered off, washed with water and dried in vacuo at 60–70°.

3.2 parts of this dyestuff are pasted in 10 parts of dimethyl sulphate and the mixture is heated for 15 minutes at 120°. The hot melt is added to 1000 parts of hot water, the solution is buffered with sodium acetate until the reaction is neutral to Congo paper and then it is clarified while hot with a little animal charcoal. The orange colour salt is precipitated in the form of the zinc chloride double salt with 3 parts of zinc chloride and sodium chloride. With concentrated sulphuric acid it has a blue-green, with sodium hydroxide solution is has a violet colour. The new dyestuff dyes polyacrylonitrile fibres from an acetic acid bath in very light fast brown-orange shades.

Dyestuffs having similar properties are obtained if, in the above example, as diazo component, instead of 1-amino-3-nitrobenzene, a corresponding amount of 1-amino-2-nitrobenzene, 1-amino-4-nitrobenzene, 1-amino-4-methylsulphonylbenzene, 1-amino-4-cyanobenzene, 1-amino-2,4-dinitrobenzene, 1-amino-2-chloro-4-nitrobenzene is used and otherwise the same procedure is followed.

*Example 5*

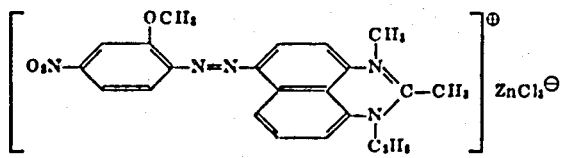

The violet azo dyestuff from 15.6 parts of 1-amino-2-methoxy-4-nitrobenzene as diazo component and 21 parts of 1-ethyl-2-methyl-perimidine as coupling component is produced analogously to the method described in Example 4. 1.5 parts of dimethyl sulphate in 10 parts of tetracholorethane are added at 120° to a solution of 3.5 parts of the dried dyestuff in 300 parts of tetrachloroethane and the reaction mass is then kept for 1 hour at 120–130°. 500 parts of water are poured in at room temperature and the organic solvent is removed by steam distillation. The red-brown aqueous solution is clarified with a little charcoal and the colour salt is precipitated, in the form of the zinc chloride double salt, with 3 parts of zinc chloride and sodium chloride. The new basic dyestuff dissolves in concentrated sulphuric acid with a blue-green and in water with a brown-orange colour. It dyes polyacrylonitrile fibres from an acetic acid bath in brown-orange shades which have excellent fastness properties.

Dyestuffs having similar properties are obtained by the same method using 1-amino-2-nitrobenzene, 1-amino-3-nitrobenzene, 1-amino-4-nitrobenzene, 1-amino-4-methylsulphonylbenzene, 1-amino-4-cyanobenzene, 1-amino-2-chloro-4-nitrobenzene.

*Example 6*

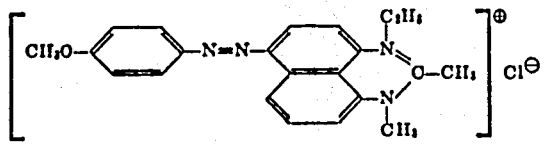

As described in Example 1, the diazonium salt produced from 12.3 parts of 1-amino-4-methoxybenzene is coupled with 25.6 parts of 1,2-dimethyl-3-ethyl-1,2-dihydro-2-hydroxyperimidine. On acidifying the coupling mass with glacial acetic acid, a yellow colour salt is obtained which can be precipitated with sodium chloride. On adding concentrated sulphuric acid the colour salt turns blue-green, on adding sodium hydroxide solution it turns red-violet. It dyes polyacrylonitrile fibres from an acetic acid bath in yellow shades; the bath is almost completely exhausted. The dyeings have excellent wet and light fastness properties.

Colour salts having similar properties are obtained by the same method on using corresponding amounts of 1-amino-2-chlorobenzene, 1-amino-3-chlorobenzene, 1-amino-3-chlorobenzene, 1-amino-4-chlorobenzene, 1-amino-2-methylbenzene, 1-amino-3-methylbenzene, 1-amino-4-methylbenzene, aminobenzene, 1-amino-2,4-dichlorobenzene, 1-amino-2,5-dichlorobenzene, 1-amino-4-acetylaminobenzene, 1-aminobenzene-4-carboxylic acid ethyl ester instead of 1-amino-4-methoxybenzene.

*Example 7*

A diazo solution produced in the usual way from 12.7 parts of 1-amino-4-chlorobenzene is slowly combined with the hydrochloric acid solution of 18.6 parts of 1,8-dimethylamino-naphthalene in 500 parts of water. The coupling solution is buffered with sodium acetate until the reaction is neutral to Congo paper and then the precipitated red-violet azo dyestuff is filtered off.

6.7 parts of the dried dyestuff so obtained are boiled for 30 minutes in a mixture consisting of 20 parts of glacial acetic acid and 20 parts of acetic acid anhydride during which period the colour of the solution changes from red-violet to yellow. The mixture is then poured into 500 parts of hot water. This solution is clarified with a little animal charcoal and the yellow colour salt is precipitated with sodium chloride. In composition and properties, the dyestuff cation corresponds to that described in Example 1.

*Example 8*

Polyacrylonitrile fibres are dyed with the water soluble azo dyestuffs described in the previous examples as follows: 1 part of colour salt is pasted in 2 parts of 80% acetic acid and dissolved by the addition of 4000 parts of hot water. One further part of 80% acetic acid, 2 parts of sodium acetate and 4 parts of a condensation product of olein alcohol and 15 mols of ethylene oxide are added and 100 parts of polyacrylonitrile fibres are introduced. The bath is heated within 30 minutes to 90°, kept for 10 minutes at this temperature and then dyeing is performed at the boil for 1 hour. The dye-bath is almost completely exhausted. The goods are then soaped for 15 minutes at 80° in 5000 parts of water with the addition of a sulphonated fatty acid condensation product, rinsed and dried. The polyacrylonitrile fibre is dyed in excellently wash and light fast yellow shades.

What is claimed is:
1. A compound of the formula

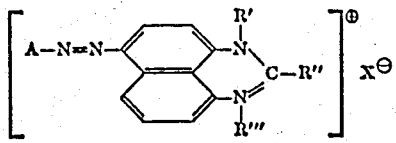

wherein
  A is free from water solubility-imparting acidic groups and is a member selected from the group consisting of phenyl and phenyl substituted with from one to three shade varying substituents selected from the group consisting of halogen, lower alkyl, lower alkoxy, lower alkoxy carbonyl, carbamyl, sulfamyl, lower alkyl sulfonyl, acetylamino, hydroxy, nitro and cyano,
  each of R' and R''' are lower alkyl,
  R'' is a member selected from the group consisting of hydrogen and lower alkyl, and
  X$^\ominus$ is an equivalent weight of a dyestuff-compatible anion.

2. A compound of the formula

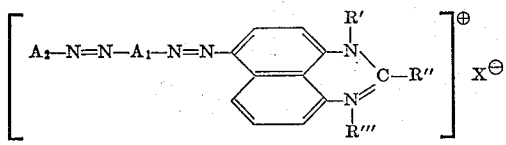

wherein
  $A_1$ is free from water solubility-imparting acidic groups and is a member selected from the group consisting of phenylene and phenylene substituted with from one to three shade varying substituents selected from the group consisting of halogen, lower alkyl, lower alkoxy, lower alkoxy carbonyl, carbamyl, sulfamyl, lower alkyl, sulphonyl, acetylamino, hydroxy, nitro and cyano,
  $A_2$ is free from water solubility-imparting acidic groups and is a member selected from the group consisting of phenyl and phenyl substituted with from one to three shades varying substituents selected from the group consisting of halogen, lower alkyl, lower alkoxy, lower alkoxy carbonyl, carbamyl, sulfamyl, lower alkyl sulphonyl, acetylamino, hydroxy, nitro and cyano,
  each of R' and R''' are lower alkyl,
  R'' is a member selected from the group consisting of hydrogen and lower alkyl, and
  $X^{\ominus}$ is an equivalent weight of a dyestuff-compatible anion.

3. The compound of the formula

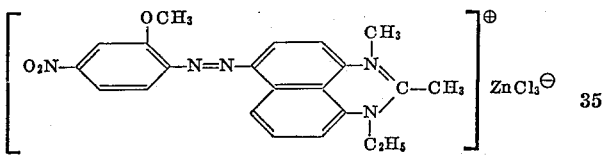

4. The compound of the formula

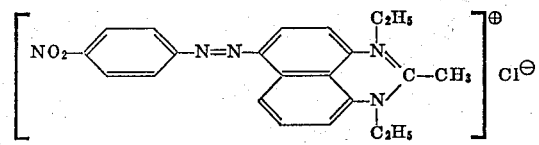

5. The compound of the formula

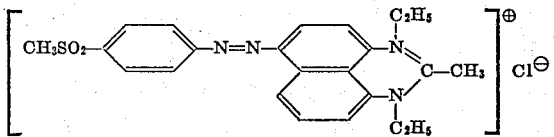

6. The compound of the formula

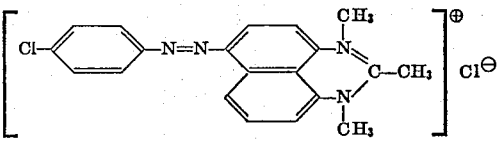

7. The compound of the formula

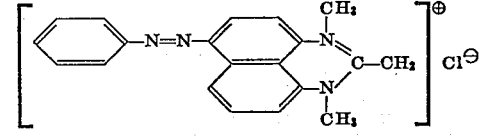

No references cited.